United States Patent
Nykerk

(10) Patent No.: US 12,097,673 B2
(45) Date of Patent: Sep. 24, 2024

(54) LIGHT MODIFIER COMPRISED OF PRINTED OPTICAL ELEMENTS

(71) Applicant: Flex-N-Gate Advanced Product Development, LLC, Tecumeseh (CA)

(72) Inventor: Todd Nykerk, Holland, MI (US)

(73) Assignee: Flex-N-Gate Advanced Product Development, LLC, Tecumeseh (CA)

(*) Notice: Subject to any disclaimer, the term of this patent is extended or adjusted under 35 U.S.C. 154(b) by 231 days.

(21) Appl. No.: 16/918,089

(22) Filed: Jul. 1, 2020

(65) Prior Publication Data

US 2021/0001578 A1    Jan. 7, 2021

Related U.S. Application Data

(60) Provisional application No. 62/870,161, filed on Jul. 3, 2019.

(51) Int. Cl.
| | |
|---|---|
| B29D 11/00 | (2006.01) |
| B29C 64/112 | (2017.01) |
| B29C 64/188 | (2017.01) |
| B33Y 10/00 | (2015.01) |
| B33Y 40/00 | (2020.01) |
| B33Y 40/20 | (2020.01) |
| B33Y 80/00 | (2015.01) |
| F21S 41/20 | (2018.01) |
| B29K 633/04 | (2006.01) |
| B29K 669/00 | (2006.01) |

(52) U.S. Cl.
CPC ...... *B29D 11/00009* (2013.01); *B29C 64/112* (2017.08); *B29C 64/188* (2017.08); *B29D 11/00442* (2013.01); *B33Y 10/00* (2014.12); *B33Y 40/20* (2020.01); *B33Y 80/00* (2014.12); *F21S 41/285* (2018.01); *B29K 2633/12* (2013.01); *B29K 2669/00* (2013.01); *B29K 2995/0026* (2013.01)

(58) Field of Classification Search
CPC ..... B29C 64/112; B29C 64/188; B33Y 10/00; B33Y 40/20; B33Y 80/00; B29D 11/00009; B29D 11/00442; F21S 41/285; B29K 2633/12; B29K 2669/00; B29K 2995/0026; H04N 1/00201
USPC .......................................... 264/1.7
See application file for complete search history.

(56) References Cited

U.S. PATENT DOCUMENTS 6,107,364 A * 8/2000 Fong ................. G02B 1/04
                                          526/292.3
6,481,844 B1 * 11/2002 Beery ................ B44F 7/00
                                          347/105

(Continued)

FOREIGN PATENT DOCUMENTS

KR    20130101734 A    9/2013

OTHER PUBLICATIONS

Thermo Fisher Scientific, "Safety Data Sheet of alpha-Methylstyrene", 2015 (Year: 2015).*

(Continued)

*Primary Examiner* — Yunju Kim
(74) *Attorney, Agent, or Firm* — Avek IP, LLC

(57) ABSTRACT

Disclosed is a method for making a lens for a vehicle light. The process involves the growth of a clear or translucent ink on a clear or transparent substrate. The deposited ink forms light-modifying optical elements on the lens, which is then incorporated into a vehicle light assembly.

20 Claims, 5 Drawing Sheets

(56) References Cited

U.S. PATENT DOCUMENTS

| | | | |
|---|---|---|---|
| 8,408,775 B1 * | 4/2013 | Coleman | G02F 1/133526 |
| | | | 362/616 |
| 2014/0104855 A1 | 4/2014 | Hutton | |
| 2016/0018081 A1 | 1/2016 | Kadoriku et al. | |
| 2016/0305619 A1 | 10/2016 | Howe | |
| 2017/0217160 A1 | 8/2017 | Daniell et al. | |
| 2018/0372627 A1 * | 12/2018 | Craig | G02B 6/006 |
| 2019/0009706 A1 | 1/2019 | Gocke | |
| 2020/0150333 A1 * | 5/2020 | Vasylyev | G02B 6/0065 |
| 2021/0379846 A1 * | 12/2021 | Feuillade | B33Y 70/00 |

OTHER PUBLICATIONS

PCT Patent Application PCT/US2020/040417 International Search Report and Written Opinion issued Oct. 1, 2020.

* cited by examiner

LIGHT MODIFIER COMPRISED OF PRINTED OPTICAL ELEMENTS

CROSS-REFERENCE TO RELATED APPLICATIONS

The application claims the benefit of U.S. Provisional Patent Application No. 62/870,161, entitled Light Modifier Comprised of Printed Optical Elements, and filed Jul. 3, 2019, the entire contents of which are herein incorporated by reference.

BACKGROUND OF THE INVENTION

1. Field

The disclosed embodiments relate generally to the field of the production of light-modifying devices. More specifically, the disclosed embodiments relate to the manufacture and production of vehicle light lenses.

2. Description of the Related Art

Inkjet printing is a common technology used for printing on paper, and in some instances even on plastics. The use of 3-D printing being used to build devices or other objects is also a known technology.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments, a process for making a light modifying article for an illumination device is disclosed. The process involves providing a clear or translucent substrate, and then growing at least one optical element on the substrate using a printing process. The ink used can be either clear or translucent. In embodiments, the article is incorporated as a lens into the illumination device, the illumination device being configured for mounting into a vehicle. The growing process can involve growing a plurality of optical elements onto the substrate. More specifically, the process includes the step of growing the plurality of optical elements onto a portion of the article, and leaving another portion of the article void of optical elements. The optical elements can be generated layer by layer thus defining chasms between each of the optical elements in the plurality, and plateaus at the top of each optical element before completion of the article.

In embodiments, the substrate can be incorporated into a vehicle lamp assembly such that the at least one optical element (or plurality) are on the interior of the assembly on a substrate surface facing a light source. Alternatively, the substrate can be incorporated into a vehicle lamp assembly such that the at least one optical element is on the exterior of the assembly opposite a light source.

In embodiments, the substrate comprises Polycarbonate. In other embodiments, the substrate comprises Polymethyl Methacrylate (PMMA).

In embodiments, the process involves applying an adhesion promoting material onto the substrate before executing the growing step, and also curing the ink using ultraviolet light (UV) during the growing step.

The process can also involve forming the article into a particular shape to meet the configuration requirements of surrounding vehicle structures, and optionally vacuum forming the article over a mold. Where needed, the process can involve cutting or otherwise removing unnecessary materials from the article.

In an alternative embodiment, a method of making a vehicle light is disclosed. The method can involve providing a clear or translucent substrate, depositing a plurality of ink layers on a top of the substrate, each of the layers in the plurality being either clear or translucent; curing each of the layers during or immediately after deposition; configuring the layers as deposited to form a plurality of optical elements on the article, the optical elements projecting upward from the substrate; and; configuring the article to be secured into a vehicle light housing. The method can optionally include leaving a distinct portion of the article void of optical elements.

The method, in embodiments, can involve incorporating the article into a vehicle lamp assembly such that the plurality of optical elements are on the interior of a vehicle light housing chamber. In embodiments, the process can involve applying an adhesion promoting material onto the substrate before depositing the layers. In yet other embodiments, the process can include using ultraviolet (UV) light for executing the curing step. The in some embodiments of the process, the forming step can include vacuum forming the article over a mold thus conforming the article into an overall vehicle body shape.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
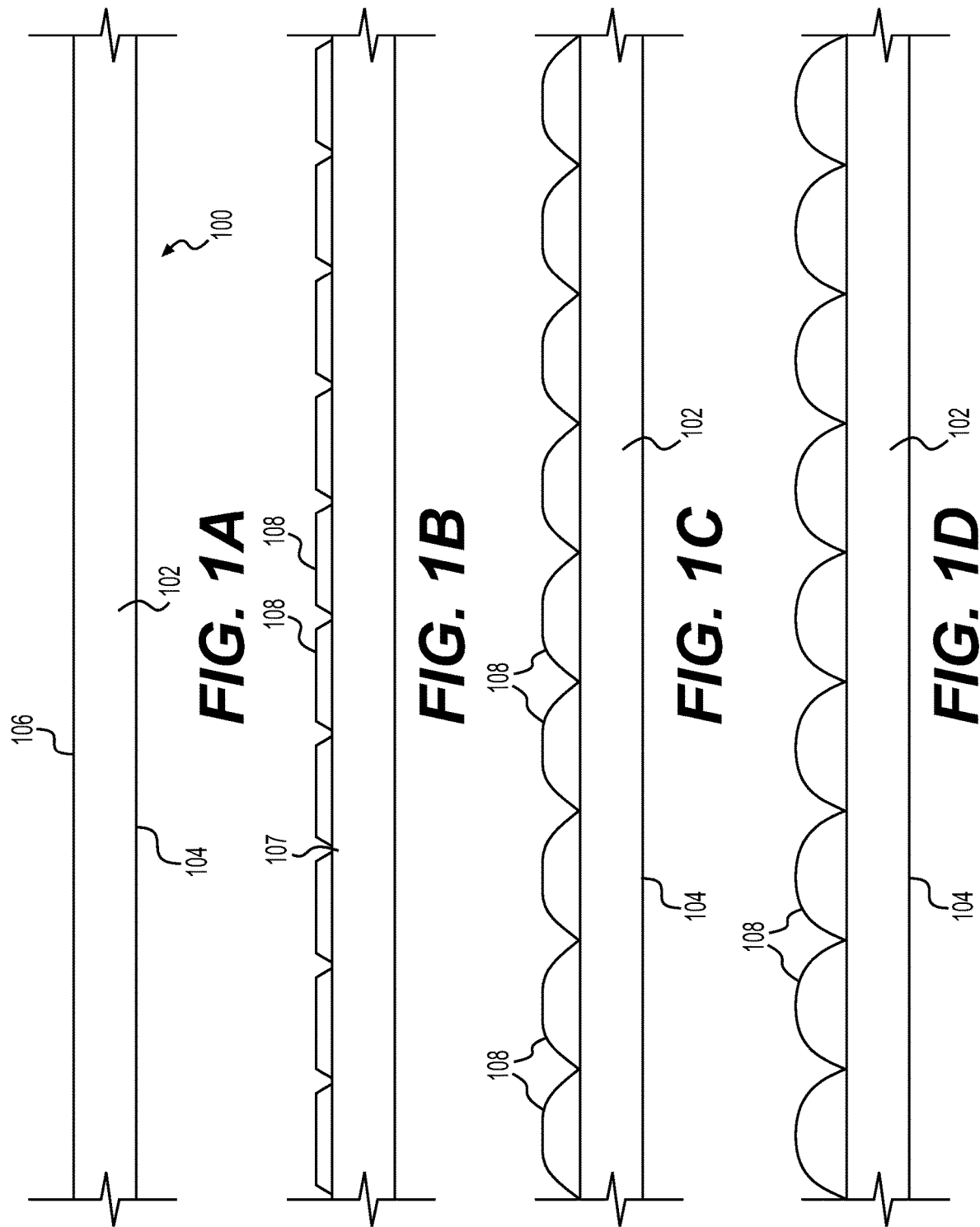
FIGS. 1A-D show a cross-sectional side view of an embodiment article being configured in four steps in development, with each step being reflected in a particular figure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Disclosed are processes for creating transparent light modifying optical components. Also disclosed are articles created using these processes. In more specific embodiments, the disclosed processes are used to create optically active components, e.g., lenses, for use with vehicle headlamps.

In one embodiment, inkjet printing is used to accomplish a multi-layer application of substantially clear or translucent ink onto a substantially clear or translucent substrate. The clear layers build up on the substrate in a manner that an optical pattern develops. The optical patterns created can be similar to conventional patterns formed in injection or extrusion molded parts, but without the need for a mold as well as other time consuming and costly aspects associated with these processes.

Additionally, completely new patterns can be created which were not accomplishable or anticipated by the earlier molding processes.

Figure 2:
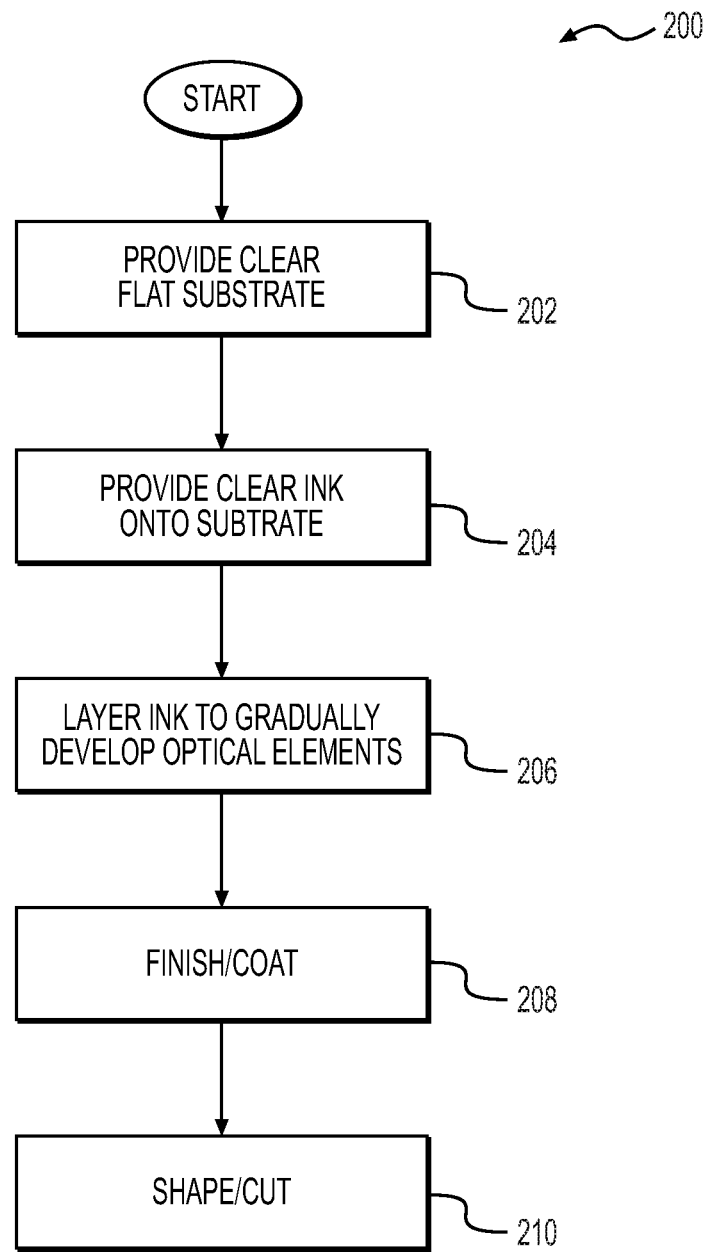
FIG. 2 is an embodiment for a process disclosed.

FIGS. 1A-D show stages in an article being formed according to the printing processes disclosed herein, and FIG. 2 discloses a process embodiment. In order to fully understand the stages illustrated in FIGS. 1A-D, it is helpful to reference the process steps expressed in FIG. 2. Referencing first FIG. 1A, it can be seen that the process 200 in FIG. 2 begins with a first step 202 where a flat clear plastic substrate 102 (see FIG. 1) is provided. The clear flat substrate may be, e.g., Polycarbonate (PC), Polymethyl Methacrylate (PMMA), or some other plastic or other material. Substrate 102 is shown as having a first under side 104 and a second top side 106.

In a next step 204, an adhesion promoting material for UV curable inks is applied. For example, in embodiments either: (i) APPL adhesion promotor of the Prodigy line of products available from INX International Ink Co., located in Schaumburg, IL; (ii) AP3155 available from Supply 55, Inc. located in Ann Arbor, Michigan; or (iii) any number of other substantially equivalent products could be used. The adhesion promotor is applied onto the top side 106 of the substrate for the purpose of preparing the substrate for receipt of the ink. More specifically, a lint free or microfiber cloth can be saturated with the adhesion promoter, and applied to areas of the substrate surface on which the printing is to be done. Next, another lint free or microfiber cloth is used to wipe the substrate and leave an evenly thin layer on which the ink will be received. It should be noted that in embodiments the application of adhesion promoting material is optional, and a direct application of ink could be made.

In a next step 206, a printer, using clear ink deposits a first layer upon adhesion promoting material that has already been applied onto the top side 106 of the substrate, and then, in embodiments, is cured using UV light. A variety of clear inks might be used. The clear ink and the adhesion promotor will cure together in embodiments. But, again, numerous clear UV curable ink compositions could be used so long as the ink is compatible for digital inkjet printing.

After that, in a step 208, a sequence of additional layers are gradually built up on top of the layer applied and cured using the UV light. This results in growth above the surface 106. In the processes of steps 208 and 210, the first and each additional layer as deposited can be sized and shaped to gradually conform to an overall optic shape, pattern, or other configuration. Upon completion of step 208, the aggregation of numerous layers of clear ink forms optically-active elements on the top side 106 of the panel 102.

For example, in the FIG. 1B embodiment, numerous of printed layers of transparent ink have been deposited resulting in an article that is only partially complete. The in-process article of FIG. 1B shows chasms 107 and plateau-shaped unfinished optical elements 108. FIG. 1C shows the same article after further layers have been deposited to create an article that is substantially more complete, wherein the optical elements 108 are higher, and the plateaus smaller. FIG. 1D shows an article that has been put into completed condition wherein the optical elements 108 have been fully formed, and in some embodiments, they will be formed into a particular pattern, e.g., a lenticular pattern in the figure. As will be shown later, the completed article can be used in numerous applications to modify light to create some desired pattern. For example, when used on a vehicle light, the elements can be used to control light spread, angling, intensity, etc.

In a next step 210, the fully grown article can be further formed, cut, or otherwise finished as desired. For example, in embodiments, the article can be vacuum formed into a particular shape for incorporation into a particular vehicle lamp configuration. It may be necessary, e.g., for the article to be incorporated into a particular vehicle design requiring that the article be continuous with, and match, surrounding vehicle panels or other structures. Vacuum forming normally involves using a vacuum to draw the preprocessed article (see, e.g., FIG. 1D) over a mold to form the article into a desired shape. Step 210 may also involve cutting or otherwise removing unnecessary materials from the preprocessed article to configure the article such that it can be secured and incorporated into an overall vehicle design. Those skilled in the art will recognize that the article may be bent, molded, or otherwise formed using known methods into a more complex shape.

Figure 3:
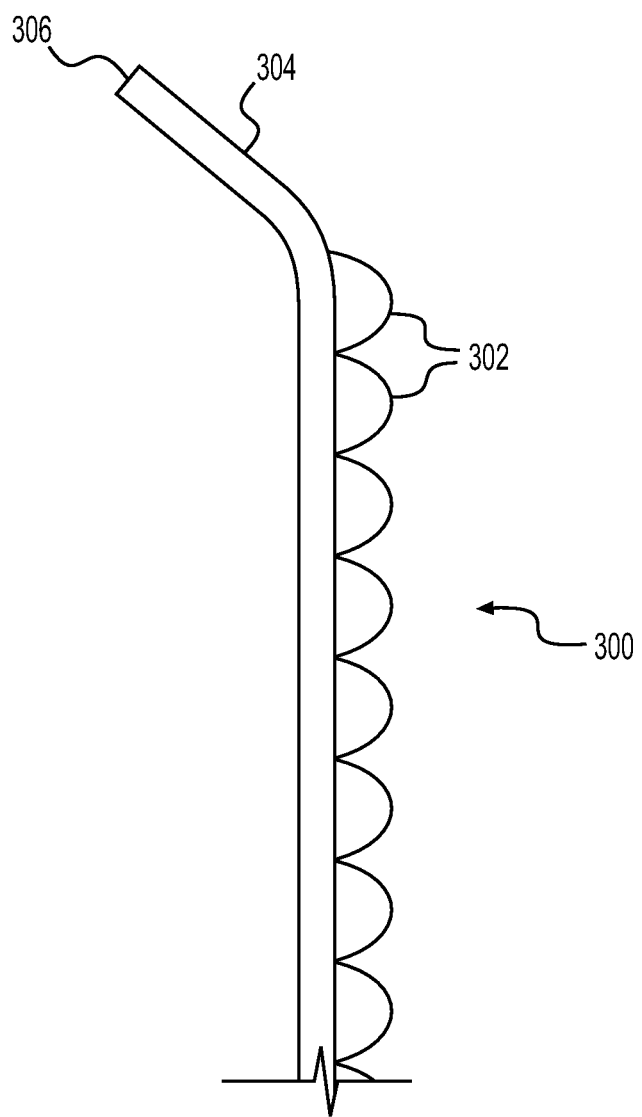
FIG. 3 is a side view of another embodiment for an article formed according to the processes of FIG. 2.
Figure 4:
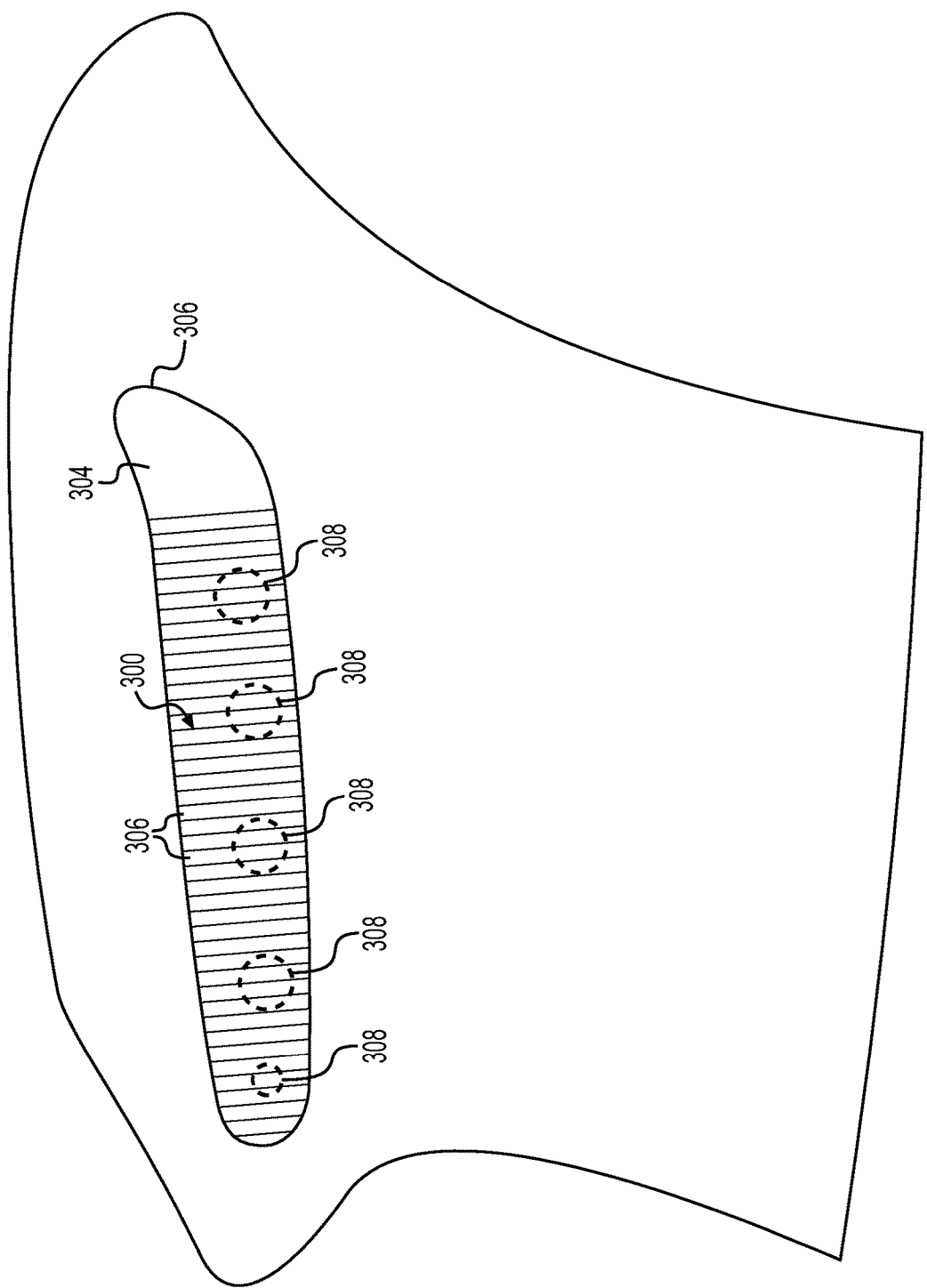
FIG. 4 shows a front view of the embodiment of FIG. 3 incorporated into a vehicle headlight arrangement.

FIGS. 3 and 4 show such an embodiment 300 of a resulting article which might be incorporated into a vehicle headlight. More specifically, it can be seen that a formerly flat, fully grown article (like the one shown in FIG. 1D) has (pursuant to an optional step 210) been bent (e.g., by subjecting to heat, and pressed over a mold) into an article like the one shown in FIG. 3. Unlike with the FIG. 1D embodiment, however, although optical elements 302 have been formed on a first portion of the lens 300, a second portion 304 (leading to a termination end 306) has not been subjected to printing, and thus, is free from optical elements. A way in which the completed article might be implemented can be seen in FIG. 4, wherein the optically active elements 306 can be seen as existing advantageously in front of a plurality of light sources 308 to create (or contribute to) a desired lighting pattern, whereas the element-free portion is bent around and contributes ornamentally and/or structurally (e.g., for attaching the lens to a lighting assembly). Additionally, by avoiding ink use, costs are reduced by only growing elements where needed.

In terms of orientation, the substrate (e.g., substrate 102) can be oriented in the vehicle light housing such that the optical elements 108 are facing inward relative to the light source (e.g., surface 106 is facing the inside of the lamp chamber). Alternatively, the substrate 102 can be installed such that the optical elements 108 are on the side of the substrate 102 that is opposite the light source (smooth surface 104 is facing inside the housing).

It should be noted that step 210 might also involve cutting the processed substrate with grown elements to fit a desired specification requirement. Further, it should be noted that the finishing step 208 could occur before step 210 as shown, or the finishing could occur after step 210 depending on manufacture advantage.

Figure 5:
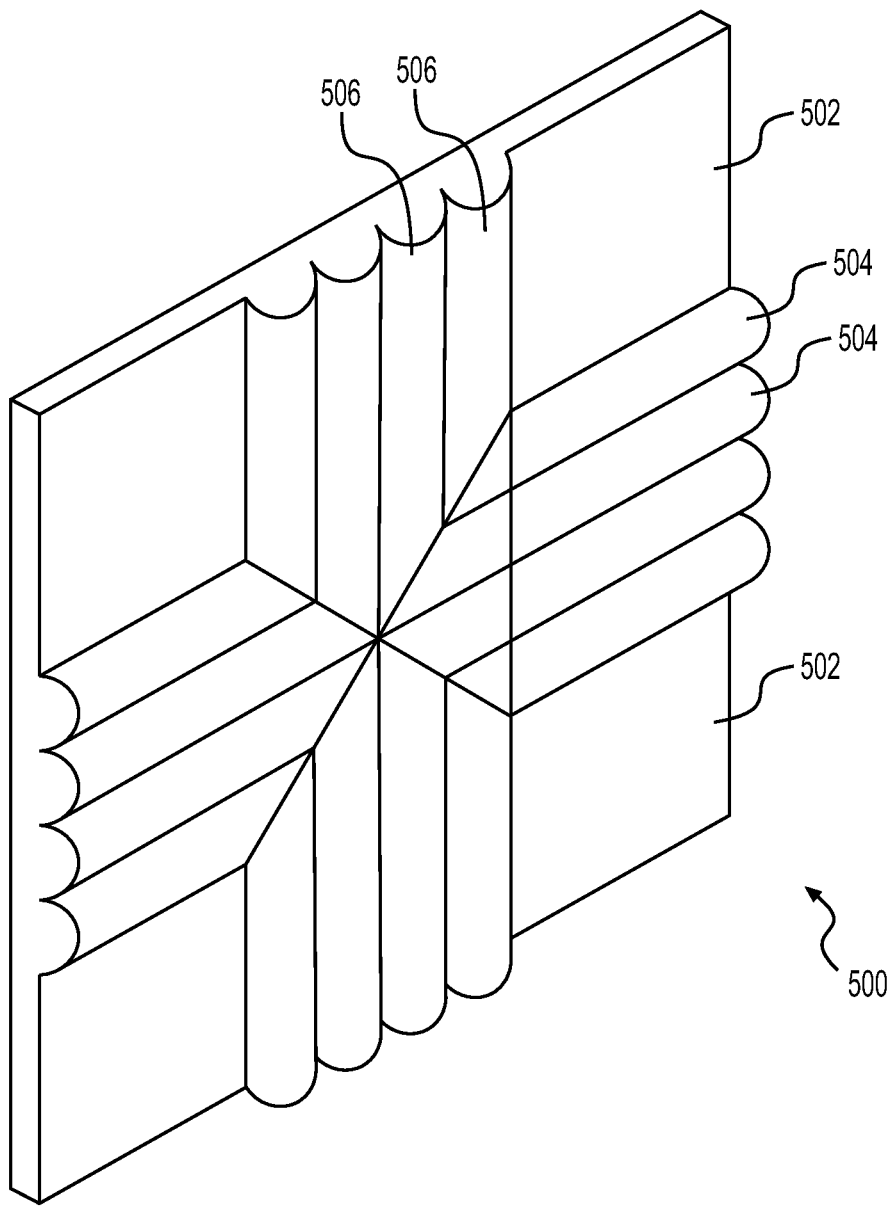
FIG. 5 shows a perspective view of yet another embodiment for an article formed according to the processes of FIG. 2.

Optionally, the printing process can limit the application/growth of elements onto only a limited portion of the substrate. For example, some portions of the substrate can be left unmodified by not printing elements onto that portion, while other portions of the substrate include elements. Further, it is contemplated that different sorts of elements could be applied/grown onto different areas of the same substrate. The embodiment shown in FIG. 5 shows all of these possibilities at once. Referring to the figure, an article 500 is shown that has been created according to the processes of FIG. 2. More specifically, the article 500 includes four areas 502 which have remained element free because there has been no growth of clear ink on the substrate. A plurality of laterally extending elements 504, however, will be used to modify light mostly in a vertical dimension. A plurality of vertically extending elements 506 will be used to modify light in mostly a lateral dimension. Not all areas/elements in FIG. 5 are enumerated for clarity of illustration.

Articles grown according to the above-discussed methods can be incorporated not only into vehicle lighting arrangements, but alternatively into numerous other arrangements requiring light modification. For example, the end product could be used in indoor or outdoor overhead lighting systems or numerous other arrangements where a particularly configured lens might be of benefit.

Features described above as well as those claimed below may be combined in various ways without departing from the scope hereof. The following examples illustrate some possible, non-limiting combinations:

(A1) A process for making a light modifying article for an illumination device, the process comprising: providing a clear or translucent substrate; and growing at least one optical element on the substrate using a printing process using an ink that is either clear or translucent.

(A2) The process denoted as (A1), incorporating the article as a lens into the illumination device, the illumination device being configured for mounting into a vehicle.

(A3) The process denoted as (A1) or (A2) wherein the growing step comprises: growing a plurality of optical elements onto the substrate.

(A4) The process denoted as any of (A1-A3) wherein the growing step comprises: growing the plurality of optical elements onto a portion of the article, and leaving another portion of the article void of optical elements.

(A5) The process denoted as any of (A1-A4) wherein the growing step comprises: creating the plurality of optical elements layer by layer thus defining chasms between each of the optical elements in the plurality, and plateaus at the top of each of the optical elements before completion of the article.

(A6) The process denoted as any of (A1-A5) comprising: incorporating the substrate into a vehicle lamp assembly such that the at least one optical element is on the interior of the assembly on a substrate surface facing a light source.

(A7) The process denoted any of (A1-A6) comprising: incorporating the substrate into a vehicle lamp assembly such that the at least one optical element is on the exterior of the assembly opposite a light source.

(A8) The process denoted as any of (A1-A7) wherein the substrate comprises Polycarbonate.

(A9) The process denoted as (A1-A7) wherein the substrate comprises Polymethyl Methacrylate (PMMA).

(A10) The process denoted as any of (A1-A9) comprising: applying an adhesion promoting material onto the substrate before executing the growing step.

(A11) The process denoted as any of (A1-A10) comprising: curing the ink using ultraviolet (UV) light during the growing step.

(A12) The process denoted as any of (A1-A11) comprising: forming the article into a particular shape to meet the configuration requirements of surrounding vehicle structures.

(A13) The process denoted as any of (A1-A12) wherein the forming step comprises: vacuum forming the article over a mold.

(A14) The process denoted as any of (A1-A13) wherein the forming step comprises: cutting or otherwise removing unnecessary materials from the article.

(A15) A method of making a vehicle light, the method comprising: providing a substrate, the substrate being clear or translucent; depositing a plurality of ink layers on a first side of the substrate, each of the layers in the plurality being either clear or translucent; curing each of the layers during or immediately after deposition; configuring the layers as deposited to form a plurality of optical elements on the substrate, the optical elements projecting outward from the first side of the substrate to form a light-modifying article, and; configuring the light-modifying article to be secured into a vehicle light housing.

(A16) The method denoted in step (A15) comprising: leaving a distinct portion of the article void of optical elements.

(A17) The method denoted in either of (A15) or (A16) comprising: incorporating the article into a vehicle lamp assembly such that the plurality of optical elements are on the interior of a vehicle light housing chamber.

(A18) The method denoted in any of steps (A15-17) comprising: applying an adhesion promoting material onto the substrate before depositing the layers.

(A19) The method denoted in any of steps (A15-18) comprising: using ultraviolet (UV) light for executing the curing step.

(A20) The method denoted in any of steps (A15-19) wherein the forming step comprises: vacuum forming the light-modifying article over a mold thus conforming the light-modifying article into an overall vehicle lamp shape.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of making a vehicle light, the method comprising:
   providing a solid clear substrate;
   creating an article through a growing process comprising:
      depositing an adhesive layer on the solid clear substrate;
      depositing a plurality of clear ink layers on a first side of the solid clear substrate to create an optical pattern;
      curing each of the layers during or immediately after deposition; and
      configuring the layers as deposited to form a plurality of substantially vertical longitudinally-extending optical elements on the substrate, the optical elements projecting outward from the first side of the substrate to form a lenticular light-modifying pattern on the substrate;
   performing a forming operation on the created article comprising:
      forming a shape of the article, including the substrate and the grown plurality of longitudinally-extending optical elements, into a desired article shape which is compatible for mounting to the vehicle light; and
   configuring the article to be secured into a vehicle light housing such that illumination from a light source within the vehicle light housing is directed forward from the vehicle, and such that the article is continuous with and matches up with surrounding vehicle panels or other structures in a particular vehicle design.

2. The method of claim 1 comprising:
   incorporating the article into the vehicle light housing such that the plurality of optical elements are on an interior of a vehicle light housing chamber and the illumination exits from a substantially flat second side of the article.

3. The method of claim 1 comprising:
   creating distinct portions of the article to include (i) a first portion including lenticular optical elements, and (ii) a second portion void of optical elements;
   using the first portion to establish an optical result; and
   using the second portion to either assist in installation or create an ornamental effect.

4. The method of claim 1 wherein forming the shape of the article comprises:
   vacuum forming the article over a mold.

5. A process for making an exterior vehicle illumination device, the process comprising:
   providing a clear flat substrate;
   creating an article through a growing process comprising:
      growing the plurality of optical elements onto a first portion of the substrate and leaving a second portion of the substrate void of optical elements;
      executing a layer-by-layer growth on the first portion of the substrate using clear ink to create a plurality of optical elements such that each optical element extends in a longitudinal dimension, and thus creating (i) a plurality of longitudinally-extending chasms between each of the optical elements and (ii) a plurality of longitudinally-extending plateaus at a top of each of the optical elements; and
      configuring the growing process such that the article is configured for mounting into a vehicle exterior such that the optical elements are one or more of (i) vertical to modify light horizontally, and (ii) horizontal to modify light vertically when receiving light emitted from a vehicle light source and then be projected away from the vehicle;
   performing a forming operation on the created article comprising:
      forming a shape of the article, including the substrate and the grown plurality of optical elements, into a desired article shape which is compatible for mounting to the vehicle light source.

6. The process of claim 5 comprising:
   incorporating the article into a vehicle lamp assembly such that the optical elements are on an interior of a vehicle lamp housing facing the vehicle light source.

7. A process for making a light modifying article for an illumination device, the process comprising:
   providing a clear flat substrate;
   delivering the clear flat substrate to an inkjet printer;
   creating an article through a growing process comprising:
      growing a plurality of longitudinally-extending optical elements onto a first portion of the substrate using a layer-by-layer inkjet printing process using clear ink to create an article pattern, including a light modifying lenticular pattern, while leaving a second portion of the substrate void of optical elements;
      configuring the article pattern for a light source mounting application such that the longitudinally-extending optical elements grown will act on light emitted from a light source before the light emitted is projected in a direction away from the light source; and
   performing a forming operation on the created article comprising:
      forming a shape of the article, including the substrate and the grown plurality of longitudinally-extending optical elements, into a desired article shape which is compatible for mounting to the light source.

8. The process of claim 7 wherein the forming operation further comprises:
   a configuring step, where the article is further configured in order to: (i) establish attachment to the light source, or (ii) create an ornamental effect.

9. The process of claim 8 wherein the configuring step comprises:
   cutting or otherwise removing unnecessary materials from the article.

10. The process of claim 9 wherein:
    creating the article further comprises:
       applying an adhesion promoting material onto the substrate before the growing step; and
       curing the ink using ultraviolet (UV) light during the growing step;
    forming the shape of the article comprises vacuum forming the article over a mold; and
    the configuring step further comprises:
       heating and bending one or more regions of the article according to the desired article shape.

11. The process of claim 7 wherein the growing step comprises:
    creating the plurality of longitudinally-extending optical elements layer by layer thus defining chasms between each of the longitudinally-extending optical elements in the plurality, and longitudinally-extending plateaus at a top of each of the longitudinally-extending optical elements before completion of the article.

12. The process of claim 7 wherein the clear flat substrate is Polycarbonate.

13. The process of claim 7 wherein the clear flat substrate is Polymethyl Methacrylate (PMMA).

14. The process of claim 7 further comprising:
    applying an adhesion promoting material onto the substrate before the growing step.

15. The process of claim 7 further comprising:
    curing the ink using ultraviolet (UV) light during the growing step.

16. The process of claim 7 wherein the forming operation comprises: vacuum forming the article over a mold.

17. The process of claim 7 wherein the forming operation comprises:
    bending or pressing the article against a mold.

18. The process of claim 17 wherein the article is heated to a forming temperature before the forming operation.

19. The process of claim 7 wherein the light source is an external vehicle light source, and the desired article shape is selected to conform with one or more surrounding vehicle components or structures.

20. The process of claim 19 comprising:
    incorporating the article into a vehicle lamp assembly such that the longitudinally-extending optical elements are in an interior of the vehicle lamp assembly on a substrate surface facing either:
    directly at the vehicle light source; or
    a direction opposite of the vehicle light source.

\* \* \* \* \*